No. 861,702. PATENTED JULY 30, 1907.
G. S. BEERS.
VEHICLE SPRING.
APPLICATION FILED MAY 25, 1906.

UNITED STATES PATENT OFFICE.

GEORGE S. BEERS, OF NEW HAVEN, CONNECTICUT.

VEHICLE-SPRING.

No. 861,702.    Specification of Letters Patent.    Patented July 30, 1907.

Application filed May 25, 1906. Serial No. 318,773.

*To all whom it may concern:*

Be it known that I, GEORGE S. BEERS, a citizen of the United States, residing at New Haven, in the county of New Haven and State of Connecticut, have invented a new and useful Improvement in Vehicle-Springs; and I do hereby declare the following, when taken in connection with the accompanying drawings and the letters of reference marked thereon, to be a full, clear, and exact description of the same, and which said drawings constitute part of this specification, and represent, in—

Figure 1:
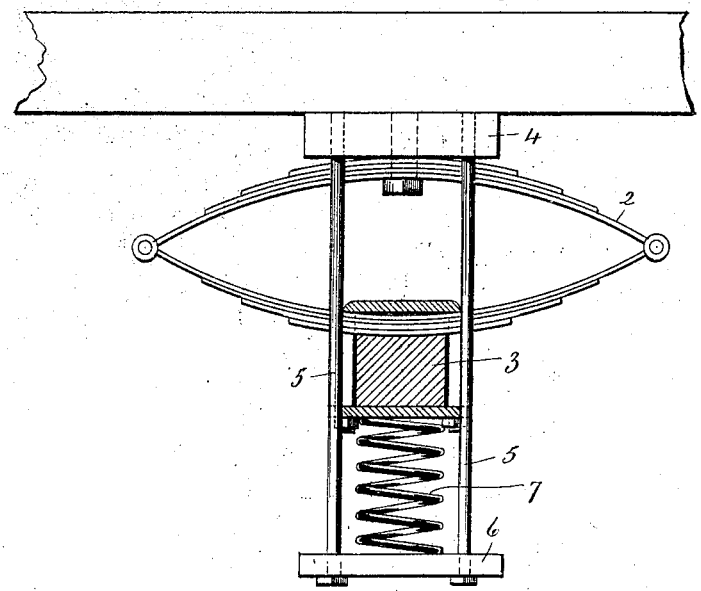
Figure 2:
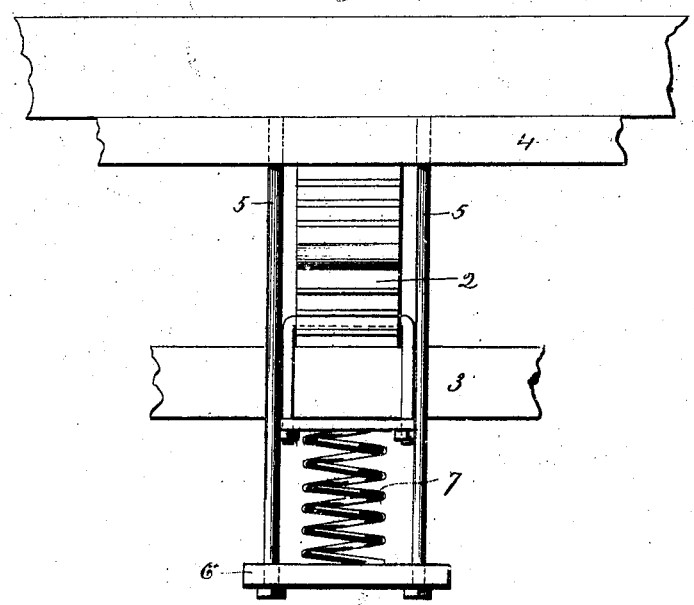

Figure 1 a side view of a spring constructed in accordance with my invention. Fig. 2 an end view thereof.

This invention relates to an improvement in vehicle springs, and while adapted for carriages, is especially designed for automobiles.

Elliptical springs as usually employed are necessarily made stiff to properly sustain the strain, and the great strain upon the spring is when the vehicle is running at a high rate of speed and passes over an obstruction or uneven surface in the road, in which case the spring is compressed, and under reaction throws the load upward with considerable force and something of a jar.

The object of this invention is to provide a counter-spring, as it might be called, to check the reaction of the main or elliptical springs; and the invention consists in the construction and arrangement as will be hereinafter described and particularly recited in the claims.

My invention is employed in connection with the usual elliptical springs 2 the lower leaves of which bear upon an axle 3, while the upper leaves are secured to a rail 4 or other section of a vehicle body. Connected with the upper leaves or with the body above the upper leaves are a number of bolts 5, preferably four in number, and two arranged on each side of the axle. At the lower ends these bolts pass through a plate 6 to which the bolts are connected. Between the axle 3 and plate 6 I place a spring 7 herein shown as a spiral spring, but for which any of the well known forms of springs may be substituted, the springs being arranged in the plane of the elliptical springs so that a thrust against the tension of the spring is in a direct line with the elliptical springs. The tension of the spring 7 is equal to the load and is of such length or size as to exert its force just before the elliptical or main springs 2 are extended to their normal limit so that any movement beyond this point, or any strain, jar or shock caused by the vehicle striking an obstruction or irregularity in the road will be taken by these counter-springs 7 and thus the upward movement of the body of the vehicle will be gradually checked so that jar to the occupants of the vehicle is avoided.

I claim:—

In a vehicle, the combination with the body and axle thereof, of an elliptical spring arranged between the body and axle, a pair of bolts arranged on each side of the axle and connected at their upper ends with the upper portion of the spring and extending below the axle, a plate below said axle and with which the lower ends of said bolts are connected, and a spring arranged between said plate and the underside of the axle and in the plane of the elliptical spring, substantially as described.

In testimony whereof, I have signed this specification in the presence of two subscribing witnesses.

GEORGE S. BEERS.

Witnesses:
CLARA L. WEED,
FREDERIC C. EARLE.